United States Patent [19]

Prusak

[11] 4,362,492
[45] Dec. 7, 1982

[54] APPARATUS FOR COMPRESSION MOLDING RECORDED DISCS

[75] Inventor: John J. Prusak, Indianapolis, Ind.

[73] Assignee: RCA Corporation, New York, N.Y.

[21] Appl. No.: 310,856

[22] Filed: Oct. 13, 1981

[51] Int. Cl.³ .............................................. B29D 17/00
[52] U.S. Cl. .................................... 425/309; 425/810
[58] Field of Search ................ 425/309, 810, 116, 388

[56] References Cited

U.S. PATENT DOCUMENTS

| 1,187,968 | 4/1970 | Rand et al. | |
|---|---|---|---|
| 3,018,513 | 1/1962 | Adams et al. | 425/810 |
| 3,061,873 | 11/1962 | Supitilov et al. | 425/810 |
| 3,397,425 | 8/1968 | Phillipson et al. | 425/810 |
| 3,474,494 | 10/1969 | Damm et al. | 425/388 X |
| 3,635,622 | 1/1972 | Wechsler | 425/116 |
| 3,702,749 | 11/1972 | Flusfeder et al. | 425/810 |
| 3,862,815 | 1/1975 | Roczynski et al. | 425/810 |
| 3,932,097 | 1/1976 | Press | 425/810 |
| 3,941,547 | 3/1976 | Hunyar et al. | 425/810 |
| 3,969,057 | 7/1976 | Pierre | 425/810 |
| 4,085,178 | 4/1978 | McNeely et al. | 264/106 |
| 4,302,175 | 11/1981 | McNeely | 425/810 |

*Primary Examiner*—J. Howard Flint, Jr.
*Attorney, Agent, or Firm*—Birgit E. Morris; Donald S. Cohen

[57] ABSTRACT

An apparatus for molding a recorded disc includes a pair of mold plates, at least one of which is movable toward and away from the other, and adapted to form a mold cavity therebetween, a center hold forming pin slidably mounted in one of the mold plates and a center plate in the other mold plate opposite the center hole forming pin. The center hole forming pin and/or the center plate includes a removable end plate at its surface which is harder than the rest of the center hole forming pin or center plate. The harder end plate has longer wear properties and can be easily and quickly replaced when it does become worn.

9 Claims, 1 Drawing Figure

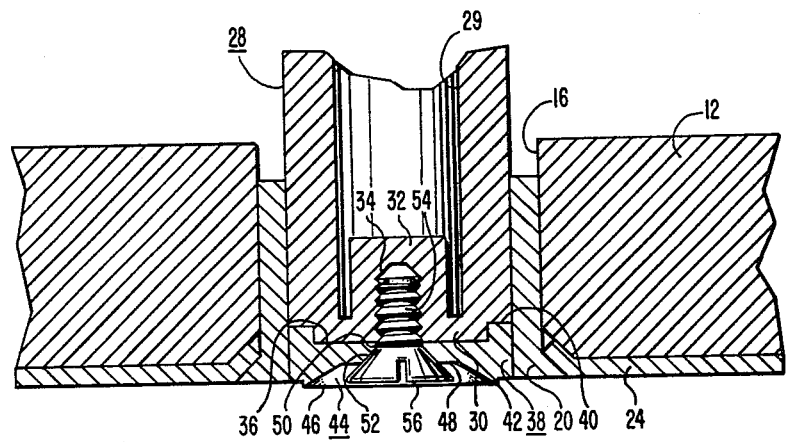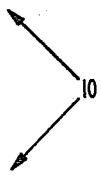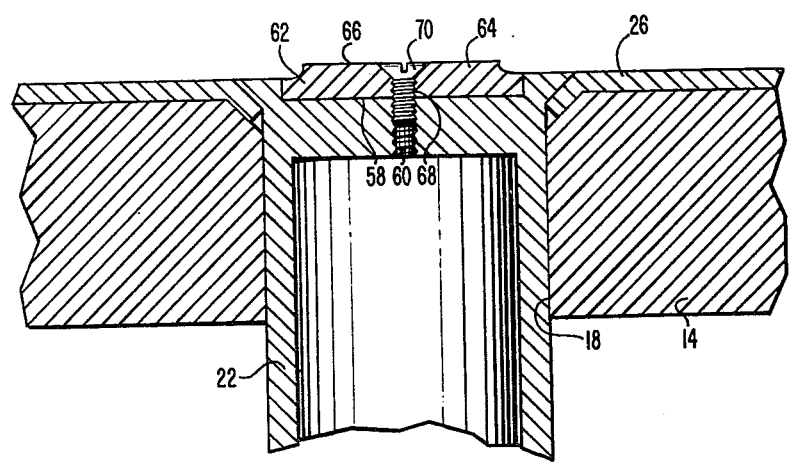

APPARATUS FOR COMPRESSION MOLDING RECORDED DISCS

BACKGROUND OF THE INVENTION

The present invention relates to an apparatus for compression molding recorded discs and particularly to such an apparatus which has center hole forming means with improved wear.

A high information density recorded disc, such as a video disc, has a packing density of the information track in the order of 10,000 rotations per inch (3,937 per cm) so that the information track must be much finer in dimensions than that of an audio disc, and rotates at a higher speed, about 450 rpm during playback, as compared to 33 rpm for an audio disc. Because of the fine dimensions of the information track and the high speed rotation of the disc, the disc must be stably supported to insure proper tracking of the stylus during playback. To help achieve this stability, the disc is provided with a relatively large center hole, about 1.3 inches (3.3 cm) in diameter and is seated in the player on a truncated conical spindle.

A method generally used to make the disc is compression molding. It has been found desirable to form the center hole in the disc as it is being molded. An apparatus suitable for forming the center hole in the disc as it is being molded is shown and described in copending applications for U.S. Patent of Michael Lee McNeely, Ser. No. 93,012, filed Nov. 9, 1979, METHOD AND APPARATUS FOR PRODUCING DISC RECORDS HAVING MOLDED-IN CENTER HOLES, and Robert Winfield Chambers et al, Ser. No. 187,161, filed Sept. 15, 1980, APPARATUS FOR MOLDING A RECORDED DISC, which are incorporated herein by reference.

The apparatus of each of the above applications includes a pair of mold plates, a center hole forming pin slidably mounted in one of the mold plates and a center plate in the other mold plate. The center hole forming pin and the center plate have surfaces which mate when forming the hole in the disc. A problem with this apparatus is that the mating surfaces of the center hole forming pin and the center plate which form the hole in the disc become worn during repeated operation of the apparatus. This causes an undesirable variation in the size of the hole formed in the disc and as well affects the surface quality of the hole formed.

Thus, when a center hole forming pin and/or a center plate becomes worn, it must be replaced which is costly with respect both to parts and down time of the apparatus. Also, the center hole forming pin is made up of an end portion which is threaded on the end of a pipe with the passage in the pipe being aligned with a passage in the end portion so that steam and water can flow to the end portion to heat and cool it. It has been found that during the operation of the apparatus there has been a tendency for the center hole forming pin to develop a leak across the junction between the end portion and the pipe. This can cause steam or water to drip onto the disc being molded, which can adversely affect the disc.

SUMMARY OF THE INVENTION

An apparatus for molding a recorded disc includes a pair of mold plates adapted to form therebetween a disc mold cavity, a center hole forming pin movable in one of the mold plates toward and away from the other mold plate at the center of the mold cavity, and a center plate in the other mold plate at the center of the mold cavity with each of the center hole forming pin and the center plate having surfaces which mate to form the center hole in the disc, the portion of at least one of the center hole forming pin or center plate having its mating surface removably secured to its respective part and of a material harder than that of its respective part.

BRIEF DESCRIPTION OF THE DRAWING

The FIGURE of the drawing is a sectional view of a portion of a molding apparatus which includes the present invention.

DETAILED DESCRIPTION OF THE INVENTION

Referring to the drawing, an apparatus for molding a recorded disc which incorporates the present invention is generally designated as 10. The molding apparatus 10 includes upper and lower mold plates 12 and 14 which are mounted so that at least one of them is movable toward and away from the other. The mold plates 12 and 14 have aligned center openings 16 and 18 respectively therethrough in which are mounted center plates 20 and 22 respectively. Stampers 24 and 26 are mounted on the opposed surfaces of the mold plates 12 and 16 respectively. The stampers 24 and 26 are thin metal plates having on the surface thereof the negative of the impression to be applied to the surface of the molded record. The stampers 24 ad 26 are in part secured to the mold plates 12 and 14 by the center plates 20 and 22 respectively.

A center hole forming pin 28 extends through and is slidable in the center plate 20 of the upper mold plate 12. The center hole forming pin 28 is an enlongated, hollow, cylindrical rod 29 having a closed end 30. The center hole forming pin 28 has an outer diameter slightly larger than the diameter of the hole to be formed in the recorded disc. A hub 32 extends inwardly from the center of the end 30, and a blind, threaded hole 34 extends from the center of the outer surface of the end 30 into the hub 32. An annular groove 36 is in the outer surface of the end 30 around the outer periphery of the rod 29.

An end plate 38 is removably mounted on the end 30 of the rod 29. The end plate 38 is circular and has an outer diameter equal to the outer diameter of the rod 29. A cylindrical flange 40 projects from the back surface of the end plate 38 and fits into the groove 36 in the rod end 30. A cylindrical projection 42 extends from the front surface of the end plate 38. The projection 42 is centered on the front surface of the end plate 38 and is of a diameter corresponding to the desired diameter for the hole in the recorded disc and is of a length approximately but preferably slightly less than one half the thickness of the recorded disc. Thus, the projection 42 is smaller in diameter than the diameter of the end plate 38 and is spaced from the peripheral edge of the end plate 38. The projection 42 has a recess 44 in its end. The side wall 46 of the recess 44 is conical and tapers radially inwardly from the edge of the projection 42 to the flat bottom 48 of the recess 44.

A hole 50 extends through the end plate 38 from the center of the bottom 48 of the recess 44 and is in alignment with the threaded hole 34 in the end 30 of the rod 29. The end 52 of the hole 50 adjacent to the bottom surface 48 of the recess 44 is slightly chamfered. A screw 54 having a tapered head 56 extends through the hole 50 and is threaded into the hole 34 so as to secure the end plate 38 to the rod 29. The screw head 56 is larger than the chamfered end 52 of the hole 50 so that the head 56 projects beyond the bottom 48 of the groove 44. However, the screw head 56 is not so large that it projects out of the groove 44. Thus, there is provided between the screw head 56 and the bottom 48 of the groove 44 a reentry, the purpose of which will be explained later.

The end plate 38 is of a material which is harder than the material of the rod 29. The end plate 38 may be of the same composition as the rod 29 but heated so as to harden it, or it may be of a composition which is harder than that of the composition of the rod 29.

The lower center plate 22 has a cylindrical recess 58 in its upper surface of a diameter equal to the diameter of the center hole forming pin end plate 38. A threaded hole 60 extends through the lower center plate 22 from the center of the bottom of the recess 58. A circular lower end plate 62 is within the recess 58. The lower end plate 62 is of a diameter equal to the diameter of the recess 58 and of a thickness equal to the depth of the recess. The lower end plate 62 has a cylindrical projection 64 extending from its top surface. The projection 64 is of a diameter equal to the diameter of the hole in the recorded disc and is of a length approximately equal to one-half the thickness of the disc. The top surface of the projection 64 is flat.

A hole 68 extends through the lower end plate 62 in the center thereof and is aligned with the threaded hole 60 in the lower center plate 22. The upper end of the hole 68 is chamfered. A headed screw 70 extends through the hole 68 in the lower end plate and is threaded into the hole 60 to secure the lower end plate 62 to the lower center plate 22. The head of the screw 70 fits completely within the chamfered end of the hole 68 so that the top end of the screw 70 is flush with the flat top surface of the lower end plate 62. The lower end plate 62 is of a material which is harder than the material of the lower center plate 22.

A recorded disc is made in the apparatus 10 in the manner described in the previously referred to McNeely and Chambers et al applications. With the mold plates 12 and 14 separated (i.e. opened), a preform of the plastic material desired for the disc is placed between the mold plates. The mold plates 12 and 14 and the center hole forming pin 28 are then heated, such as by passing hot water or steam through channels (not shown) in the mold plates and through the passage in the rod 29 of the center hole forming pin 28. The heated mol plates 12 and 14 are then moved toward each other (i.e. closed) and contact the preform to cause the material of the preform to flow radially outwardly between the stampers 24 and 26. The mold plates 12 and 14 are closed until they form a mold cavity of the size of the desired recorded disc.

As the mold plates 12 and 14 are closing, the center hole forming pin 28 is advanced through the preform to push out the plastic material from the center hole area. The center hole forming pin 28 is advanced until the end of the projection 42 of the end plate 38 engages the surface 66 of the lower end plate 62. As the center hole forming pin 28 moves through the plastic material, some of the plastic material will fill the recess 44 in the end plate 38.

When the mold plates 12 and 14 are completely closed and the center hole forming pin 28 is moved through the plastic material, the mold plates 12 and 14 and the center hole forming pin 28 are cooled by passing cooler water therethrough. This cools the material of the disc so that it hardens. This also hardens the plastic material which has filled the recess 44 in the end plate 38. The mold plates 12 and 14 are then opened to allow removal of the finished molded disc. When the center hole forming pin 28 is moved away from the lower center plate 22, the hardened plastic material in the recess 44 will be retained therein by the portion of the material which is in the reentry between the screw head 56 and the recess bottom 48.

During the molding of a disc, the end plates 38 and 62 provide the surfaces of the center hole forming pin 28 and the lower center plate 22 which engage the plastic material to form the hole in the disc. Thus, the end plates 38 and 62 provide the surfaces which are subject to wear. Since the end plates 38 and 62 are of a harder material than the rod 29 and the lower center plate 22, they will last much longer before becoming worn. Since the end plates 38 and 62 are much smaller in size than the rod 29 and the lower center plate 22, they can be hardened much easier than hardening the entire rod 29 and lower center plate 22. Also, when the end plates 38 and 62 do become worn, they can be easily replaced by merely removing the screws 54 and 70. Thus, there is a minimum of downtime when the end plates are replaced. Thus, the harder end plates 38 and 62 not only provide for longer operation of the molding apparatus 10 before they become worn and must be replaced, but also permit their replacement with little downtime of the molding apparatus.

I claim:

1. In an apparatus for molding a recorded disc which includes a pair of mold plates adapted to form therebetween a disc mold cavity, a center hole forming pin movable in one of the mold plates toward and away from the other mold plate at the center of the mold cavity and a center plate in the other mold plate at the center of the mold cavity with each of the center hole forming pin and center plate having surfaces which mate to form the center hole in the disc, the improvement comprising:

the portion of at least one of the center hole forming pin or center plate having its mating surface removably secured to its respective part and being of a material harder than the material of its respective part.

2. An apparatus in accordance with claim 1 in which the center hole forming pin comprises an elongated, cylindrical rod having a closed end and the mating surface is a circular end plate removably secured to the closed end of the tube.

3. An apparatus in accordance with claim 2 in which the end plate has a recess in its end surface which faces the center plate, and a hole extends through the end plate from the center of the bottom of the recess, a tapered headed screw extends through the hole in the end plate and is threaded into the closed end of the rod to removably secure the end plate to the rod, the head of the screw projects beyond the bottom of the recess in the end plate to form a reentry with the bottom of the recess.

4. An apparatus in accordance with claim 3 in which the sidewall of the recess is conical and tapers radially inwardly from the outer surface of the end plate.

5. An apparatus in accordance with claim 4 in which the end plate has a projection extending from its outer surface, the recess is in the projection and the edge of the sidewall of the projection is adjacent the periphery of the projection.

6. An apparatus in accordance with claim 5 in which the end plate is of a diameter larger than the diameter of the hole to be formed in the disc, and the projection is of a diameter equal to the diameter of the hole to be formed and of a length no greater than one-half the thickness of the disc to be molded.

7. An apparatus in accordance with claims 1 or 6 in which the center plate has a cylindrical recess in its surface which faces the center hole forming pin and its mating surface is a circular end plate removably secured in the recess.

8. An apparatus in accordance with claim 7 in which the center plate end plate has a cylindrical projection extending from its surface which faces the center hole forming pin, said projection being of a diameter equal to the hole to be formed in the disc and of a length no greater than one-half the thickness of the disc.

9. An apparatus in accordance with claim 8 including a headed screw extending through a hole in the center of the center plate end plate and threaded into the hole in the center plate.

* * * * *